United States Patent Office 2,953,325
Patented Sept. 20, 1960

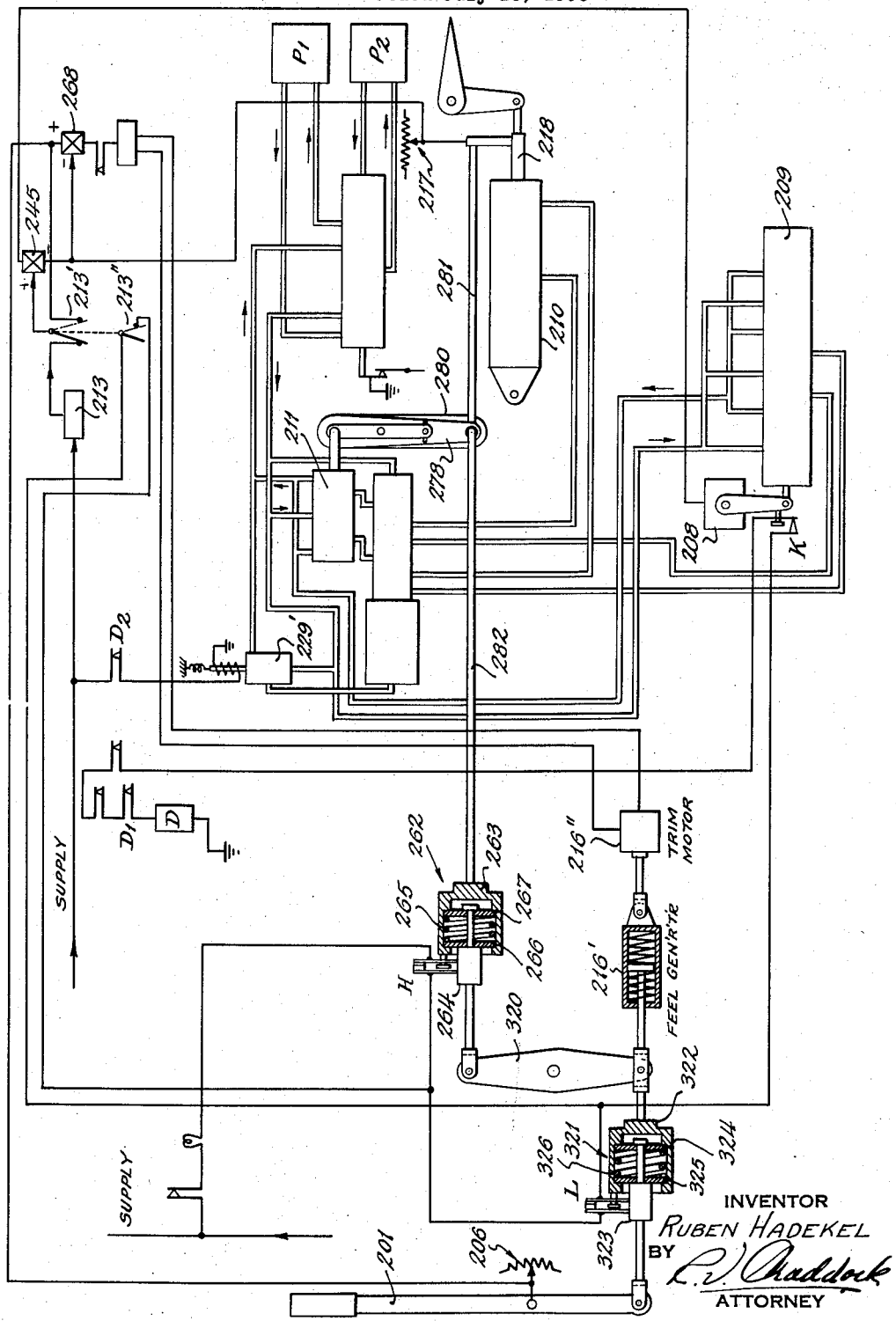

2,953,325

CONTROL SYSTEMS FOR AIRCRAFT

Ruben Hadekel, London, England, assignor to The Sperry Gyroscope Company Limited, Brentford, England, a company of Great Britain Filed July 18, 1956, Ser. No. 598,686

Claims priority, application Great Britain July 29, 1955

3 Claims. (Cl. 244—76)

This invention relates to control systems for aircraft and is an improvement in, or modification of, the control system shown and described in the prior U.S. application S.N. 495,143, filed March 18, 1955, by H. B. Sedgfield, W. R. Bohnel, A. P. Glenny and F. A. Summerlin, which patent application will hereinafter be referred to as the "Main Case."

The Main Case is concerned with an arrangement for providing alternative electrical control and emergency mechanical control of one and the same hydraulic servo-motor for actuating the control surface of an aircraft. The Main Case claims inter alia an integrated electro-hydraulic and mechanico-hydraulic control system capable of exercising control of an hydraulic servo-motor in either of two modes of operation, one of which effects control electro-hydraulically from an electric control signal, and the other effects control mechanico-hydraulically from a manual controller comprising: electrical differential means adapted to provide an electrical control quantity under the differential control of two electric signal producing devices, one providing a demand signal defining motion to be imparted to a load member, such as a control surface of an aircraft, by means of the hydraulic servo-motor, and the other providing a negative feedback signal in dependence on motion of the output member of the servo-motor; and electrical control device having connections for receiving the electrical control quantity; a mechanical differential means connected or adapted to be connected between the manual controller and the output member of the servo-motor, and having a differential output member adapted to be displaced in accordance with the difference between displacement of the manual controller and the output member of the servo-motor; the said electrical control device and the said mechanical differential output member each being adapted to control valve means suitable for variably controlling the delivery of pressure fluid from a pressure source to the servo-motor to cause movement of the output member of the servo-motor in one direction or the other; and control-transfer means adapted selectively to render either the mechanical differential means or the electrical differential means effective, and the other ineffective, to control the operation of the servo-motor. In the mechanico-hydraulic mode, a manual controller is coupled via a mechanical differential to the output member of a servo-motor, which servo-motor operates the control surface of an aircraft. The mechanical differential compares the position of the manual controller with the position of the output member of the servo-motor, the result of the comparison being applied to valve means which controls the flow of high pressure fluid to the hydraulic servo-motor, and which therefore controls the position of the output member of the servo-motor. Thus the manual controller operates the control surface of the aircraft through a mechanical linkage with the aid of a hydraulic servo mechanism. In the electro-hydraulic mode of operation—an electric signal, which may be derived from a generator associated with a manual controller or alternatively, may be derived from a flight monitoring unit, is fed with a signal derived from a generator associated with the output member of the servo mechanism to an electrical differential means. The result of the comparison is fed to an electrically operated hydraulic valve which also controls the flow of high pressure fluid to the servo-motor. The mechanical linkage between the output member of the servo-motor and the manual controller may serve during automatic control to cause the manual controller to follow the motion dictated by the automatic flight monitoring unit. The pilot can therefore observe this movement and verify for himself that the automatic control is functioning satisfactorily. However, it is preferred that sufficient lost motion in the linkage should be provided during automatic control, the control surface of the aircraft moves only within the lost motion of the linkage. In this case the servo-motor does not move the manual controller, but the latter nevertheless is arranged to assume a position corresponding to the long term average position of the control surface rather than the actual position thereof due to an automatic adjustment of an artificial feel device, which device is described in the Main Case and in the prior U.S. application S.N. 525,682, filed August 1, 1955 for Control Systems for Aircraft by H. B. Sedgfield, M. L. Jofeh, R. Hadekel and W. R. Bohnel.

Briefly, the artificial feel device is connected to the manual controller and centralizes it to a long term average position with the aid of a trim motor which adjusts the central position of the device in a very slow manner. The centralising forces on the manual controller give the pilot some reaction to his movement of the manual controller away from the centralized position.

The Main Case also describes the use of a change-over valve which changes the hydraulic connection so that either the mechanico-hydraulic or the electro-hydraulic mode may be used.

Several emergency conditions may arise, due to failure in one or more parts of the system, and in these emergencies it is desirable that the mode of operation should always revert to the mechanico-hydraulic mode. Besides various automatic arrangements for reverting to the mechanico-hydraulic mode, which arrangements are more fully described in the Main Case, it is desirable that the pilot should be able to cause the system to revert from automatic control to the mechanico-hydraulic mode by movement of the manual controller. For this purpose there is described in the Main Case a yieldable switch arrangement which is provided in the mechanical link between the mechanical differential and the manual controller, so that when the pilot moves the manual controller with some force against the motion dictated by the automatic control, the switch is arranged to operate and causes the system to revert to the mechanico-hydraulic mode.

In the drawing of the Main Case, the yieldable safety switch is provided in the linkage between the manual controller and the mechanical differential means in that part which is included between the mechanical differential means and the artificial feel device. In this position the yieldable coupling also provided protection for the linkage and for this reason it had to be designed so that it would not yield in response to forces applied to the linkage in normal operation. In consequence, the pilot could only cause the safety switch to yield by applying to the manual controller a force in excess of the normal force applied to the linkage. This could have the disadvantage that the large force necessary may lead to over-control while the changeover is being effected.

In the case where the movement of the control surface, during automatic control, is within the limits of the lost motion of the linkage little or no force is normally applied to the feel device by the servo-motor. However before the safety switch could be made to yield by movement of the manual controller it would first be necessary to move the manual controller against the feel device forces to take up the lost motion.

Since the condition when the lost motion is taken up, after change-over to the mechanico-hydraulic mode, corresponds to a demand for a large change in the position of the control surface it will readily be appreciated that immediately after the yielding of the safety switch the control surface will make an undesired movement of considerable magnitude until such times as the pilot moves the manual controller back to its original position.

The object of the present invention is to provide a system in which the yieldable safety switch is so positioned as to mitigate these disadvantages.

According to the present invention, a yieldable coupling is located within the mechanical connection between the manual controller and the artificial-feel device the force required to cause said coupling to yield to the extent of actuating the switch means being arranged to be greater than the force required to transmit displacement to the manual controller but less than the maximum feel force which may be provided by the artificial-feel device, the actuation of the switch means associated with the yieldable coupling being adapted to cause the control transfer means to render the mechanical differential means effective to control the servo-motor. Provision may be made for having a second yieldable coupling in the linkage between the artificial-feel device and the servo-motor, e.g. in the position shown in the drawing of the Main Case. In this case, the second yieldable coupling serves only the purpose of protecting the linkage since the first yieldable coupling requires considerably less force to operate in relation to the second yieldable coupling, with lesser force may be of the order of 10 or 20 lb. weight. The first yieldable coupling is now not subjected during automatic control to any forces which might be applied to the artificial feel device by the output member of the servo-motor through the mechanical connection. The forces that it now has to transmit during automatic control are merely the forces required to move the manual controller against its own inertia and friction.

In order that the invention may be readily carried into effect an embodiment will now be described with reference by way of example, to the accompanying drawing, which shows diagrammatically that part of the control system which is most directly concerned.

The drawing shows a manual controller 201, which is coupled through a yieldable coupling 321 to a centrally pivoted lever 320. The other end of lever 320 is connected through a second yieldable coupling 262 to the output member 218 of a servo-motor 210 via a mechanical differential 278, 280. Connected to the lower end of lever 320, there is also a feel generator 216' which is controlled by a trim motor 216". In the electro-hydraulic mode of operation, an electric signal from potentiometer 206 corresponding to the position of the manual controller 201 or derived from an automatic control unit 213, is compared with a signal corresponding to the position of the output member 218 of the servo-motor. This signal is provided by the potentiometer 217. The result of the comparison of the signal difference means 245 feeds transducer 208 to control a hydraulic valve 209 which in turn, controls the servo-motor 210. During automatic control the movement of the output member 218 of the servo-motor 210 is arranged to move the manual controller 201 through the linkage 281, 282 by the provision of lost motion in the linkage, which lost motion is provided to a substantial degree by the mechanical differential. In certain circumstances, for example at very low speeds, it may be desirable to move the control surface to a rather large extent, which movement will take up the lost motion and then move the manual controller and at the same time exert force on the feel device. Coupling 262 must be able to transmit this force without yielding. In contrast, the forces transmitted through the yieldable coupling 321 during automatic control are only those which are necessary to overcome the inertia and friction of the manual controller 201. Those forces are very much lower, of course, than those which coupling 262 may have to transmit and therefore coupling 321 may be arranged to yield with relatively lower forces.

The yieldable coupling 321 comprises two members 322 and 323 which are inter-connected by means of a spring 326 via two spaced members 324 and 325 and is associated with a switch L. This arrangement transmits the normally low forces without yielding substantially but when a force of above normal magnitude, whether of tension or compression, is applied to the coupling, the two members 322 and 323 move towards each other against the action of the spring until a projection on the member 322 displaces one or other contact of the switch L to open the contacts. This opening of the contacts breaks an electrical circuit which is arranged to cause the system to revert to the mechanico-hydraulic mode of operation by operating the change-over valve 229'. In the condition of the parts shown in the drawing, the system is operating in the automatic pilot mode and valve 229' is energized from an electrical supply line by way of the closed contacts $D_2$ of relay D to ground. When thusly conditioned, the servo means 210 is controlled by the hydraulic valve 209. Fluid pressure for the system is obtained from the fluid sources noted at $P_1$ and $P_2$ in the drawing. The change-over valve is set to condition the system for operation by the manual controller 201 when the circuit including relay D is opened which results in the opening of contacts $D_2$. This breaks the supply of energy to the coil operating the valve 229' and enables a suitable spring to change the setting of the valve so the system is conditioned for manual operation. In this mode, the output of the mechanical differential 278, 280 to the hydraulic control valve 211 controls the operation of the servo means 210.

Yieldable coupling 262 comprises two members 263 and 264, inter-connected by a spring 265 via two spaced members 266 and 267 and is associated with a switch H.

The construction of coupling 262 is similar to that of coupling 321 with the exception that the spring 265 is very much stronger than spring 326 and therefore coupling 262 only yields sufficiently to open the contacts of switch H with a force which is considerably greater than that required to cause coupling 321 to yield. As mentioned before, this must be so in order that the forces which might be applied by artificial feel device 216' to the linkage connection with the servo motor may be transmitted without yielding substantially.

The monitoring means provided for the improved system is a normally closed circuit from a suitable electrical supply in which switches H, L, K, the contacts $D_1$ of relay D and relay D are located in series. Accordingly, when the contacts of either switches L and/or H open due to excessive forces in the linkage between differential arm 278 and the controller 201, the relay D will become unenergized and the contacts $D_2$ will open to change the mode of operation of the system through the change-over valve 229'.

The trim motor 216" is a slow operating motor that adjusts the feel device 216' and through yieldable coupling 321 the controller 201 so that the position thereof corresponds to the long term average position of the control surface positioned by the servo means 210 or the long term attitude of the craft about its axes. As shown, the trim motor 216" is controlled by the output of a signal difference means or electrical differential 268. The inputs to the differential 268 are derived from the signal input means or potentiometer 206 operatively connected to the controller 201 and the signal input means or potentiometer 217 whose signal is in accordance with the output of the servo means 210. Since the manual controller 201 is free to move within the limits of the lost motion during automatic control, it, the manual control, assumes the centralized position of the feel generator 216' and therefore moves with the movement of the feel generator under the control of trim motor 216". During manual control in the electro-hydraulic mode, the manual controller is moved by the pilot against forces supplied by the artificial feel generator 216', which forces, for displacements of a manual controller other than small ones, may be in excess of the force necessary to cause yieldable coupling 321 to yield. When the system is operative in the electro-hydraulic mode with switch 213' closed in the dotted line position shown in the drawing, the monitoring switch L is bypassed by a shorting circuit including suitable leads connected to the respective sides of the switch and closed bypass switch 213" ganged to switch 213'.

During this mode of control, if an emergency condition arises which is not catered for by the numerous automatic means, described in the main case, of causing the system to revert, the pilot may apply considerable force to the normal controller to cause coupling 262 to yield as described in the main case, and thereby cause the system to revert to the mechanico-hydraulic mode.

Thus by an arrangement in accordance with the invention, the pilot can be provided with a light and sensitive means of causing the control to revert from automatic electro-hydraulic control to manual mechanico-hydraulic control by the application of a relatively small force to the manual controller.

What is claimed is:

1. A combined manually operable and automatic pilot control system for aircraft including servo means for controlling the attitude of the craft about an axis; an automatic pilot and manual controller operatively connected to said servo means, a change-over valve for conditioning the system for operation by either the automatic pilot or the manual controller; means for positioning said controller in accordance with the long term attitude of the craft about its axis including signal difference means, means providing an input to said difference means in accordance with the output of said servo means, means providing a second input to said signal difference means operatively connected to the controller, and motive means driven by the output of said difference means and operatively connected to said controller through a feel device; and monitoring means for operating said change-over valve to condition the system for operation by the manual controller including normally ineffective switch means and a yieldable coupling interconnecting the servo means and controller connected to the switch means, the force required to cause said coupling to yield to the extent necessary to render the switch means effective being greater than the force required of the servo means to transmit displacement to the manual controller and less than the maximum feel force provided by the feel device.

2. A control system of the character claimed in claim 1, in which said monitoring means includes a second normally ineffective switch means and a second yieldable coupling between the servo means and the controller connected to the second switch means, the force required to cause said second coupling to yield to the extent necessary to render the second switch means effective being greater than the normal force between the servo means and controller.

3. A control system of the character claimed in claim 1 in which said monitoring means includes a second normally ineffective switch means, a circuit including the first and second switch means in series relation, a second yieldable coupling between the servo means and controller connected to the second switch means, and settable means for bypassing the first switch means of said circuit, the force required to cause said second coupling to yield to the extent necessary to render the second switch means effective being greater than the normal force between the servo means and controller.

References Cited in the file of this patent

UNITED STATES PATENTS 2,678,177    Chenery et al. _____ May 11, 1954